US012299761B2

(12) United States Patent
Beaurepaire et al.

(10) Patent No.: US 12,299,761 B2
(45) Date of Patent: May 13, 2025

(54) METHOD, APPARATUS, AND COMPUTER PROGRAM PRODUCT FOR QUANTIFYING PUBLIC TRANSPORT COVERAGE

(71) Applicant: HERE Global B.V., Eindhoven (NL)

(72) Inventors: Jerome Beaurepaire, Berlin (DE); Nicolas Neubauer, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 299 days.

(21) Appl. No.: 17/732,673

(22) Filed: Apr. 29, 2022

(65) Prior Publication Data
US 2022/0351319 A1  Nov. 3, 2022

Related U.S. Application Data

(60) Provisional application No. 63/182,163, filed on Apr. 30, 2021.

(51) Int. Cl.
*G06Q 50/40* (2024.01)
*G01C 21/00* (2006.01)
(Continued)

(52) U.S. Cl.
CPC ......... *G06Q 50/40* (2024.01); *G01C 21/3492* (2013.01); *G01C 21/3807* (2020.08);
(Continued)

(58) Field of Classification Search
CPC ............... G06Q 50/40; G01C 21/3878; G01C 21/3807; G01C 21/3492; G05B 13/0265; G08G 9/00
See application file for complete search history.

(56) References Cited

U.S. PATENT DOCUMENTS 9,002,640 B2   4/2015 Beaurepaire et al.
10,380,891 B1  8/2019 Caywood et al.
(Continued)

FOREIGN PATENT DOCUMENTS

CN   110222884 A   9/2019
CN   110796337 A   2/2020
CN   112348344 A   2/2021

OTHER PUBLICATIONS

Tahmasbi et al., "Public transport accessibility measure based on weighted door to door travel time", Computers, Environment and Urban Systems, vol. 76, (Jul. 2019), pp. 163-177.

*Primary Examiner* — Naeem Taslim Alam
(74) *Attorney, Agent, or Firm* — Alston & Bird LLP

(57) ABSTRACT

A method, apparatus and computer program product are provided for quantifying public transport coverage. In this regard, for a traveler journey beginning at a starting location, transit time data is determined. The transit time data is indicative of a predicted amount of time to travel between the starting location and a departure location associated with a public transport boarding location for a public transport. Furthermore, waiting time data is determined. The waiting time is indicative of a predicted amount of time to wait at the departure location prior to departure via the public transport. Additionally, time to departure data is computed based on a combination of the transit time data and the waiting time data. For the traveler journey, a time to departure probability prediction is also determined.

19 Claims, 9 Drawing Sheets

(51) Int. Cl.
  *G01C 21/34* (2006.01)
  *G05B 13/02* (2006.01)
  *G08G 9/00* (2006.01)

(52) U.S. Cl.
  CPC ..... *G01C 21/3878* (2020.08); *G05B 13/0265* (2013.01); *G08G 9/00* (2013.01)

(56) References Cited

U.S. PATENT DOCUMENTS

| | | | |
|---|---|---|---|
| 2013/0204525 A1* | 8/2013 | Pfeifle | G01C 21/3469 |
| | | | 701/400 |
| 2013/0234868 A1* | 9/2013 | Koth | G08G 1/133 |
| | | | 340/994 |
| 2013/0243252 A1* | 9/2013 | Xu | G08B 23/00 |
| | | | 382/103 |
| 2014/0163861 A1* | 6/2014 | Beaurepaire | G01C 21/38 |
| | | | 701/400 |
| 2014/0257949 A1* | 9/2014 | Gishen | G06Q 30/0252 |
| | | | 705/14.5 |
| 2015/0268052 A1* | 9/2015 | Berczi | G01C 21/343 |
| | | | 701/408 |
| 2015/0308844 A1* | 10/2015 | Shimazaki | G01C 21/3423 |
| | | | 701/465 |
| 2016/0003637 A1* | 1/2016 | Andersen | G01C 21/362 |
| | | | 701/519 |
| 2019/0285423 A1* | 9/2019 | Suzuki | G01C 21/3423 |
| 2020/0242924 A1* | 7/2020 | Publicover | G08G 1/087 |
| 2021/0003409 A1* | 1/2021 | Uematsu | G06F 17/18 |
| 2021/0118079 A1* | 4/2021 | Li | G06Q 50/47 |
| 2022/0262249 A1* | 8/2022 | Hayashi | G08G 1/127 |

\* cited by examiner

METHOD, APPARATUS, AND COMPUTER PROGRAM PRODUCT FOR QUANTIFYING PUBLIC TRANSPORT COVERAGE

CROSS REFERENCE TO RELATED APPLICATIONS

This application claims the benefit of U.S. Provisional Patent Application No. 63/182,163, titled "METHOD, APPARATUS, AND COMPUTER PROGRAM PRODUCT FOR QUANTIFYING PUBLIC TRANSPORT COVERAGE," and filed on Apr. 30, 2021, the entirety of which is hereby incorporated by reference.

TECHNOLOGICAL FIELD

An example embodiment of the present disclosure generally relates to dynamic routing technologies and, more particularly, to a method, apparatus and computer program product for quantifying public transport coverage.

BACKGROUND

Navigation systems typically determine timing information for a navigation route based on static information such as, for example, distance between a starting location and a destination location. However, it is typically difficult for a navigation system to accurately determine certain types of timing information such as, for example, waiting time for a navigation route.

BRIEF SUMMARY

A method, apparatus and computer program product are provided in order to quantify public transport coverage for a location based on predicted time to departure data. For instance, in one or more embodiments, method, apparatus and computer program product are provided in order to determine a time to departure probability prediction indicative of a probability of departure via a public transport at a departure location satisfying a predefined temporal threshold. As such, precision and/or confidence of navigation, routing, and/or journey planning capabilities can be improved. Furthermore, a number of queries and/or number of displays for user interaction with respect to a user interface configured for navigation, routing, and/or journey planning can be reduced.

In an example embodiment, a computer-implemented method is provided for quantifying public transport coverage. The computer-implemented method includes, for a traveler journey beginning at a starting location at a respective time of day, determining transit time data indicative of a predicted amount of time to travel between the starting location and a departure location associated with a public transport boarding location for a public transport. The computer-implemented method also includes determining waiting time data indicative of a predicted amount of time to wait at the departure location prior to departure via the public transport for the traveler journey beginning at the respective time of day. The computer-implemented method also includes computing, based on a combination of the transit time data and the waiting time data, time to departure data indicative of a predicted amount of time until departure via the public transport at the departure location. Furthermore, the computer-implemented method includes, for the traveler journey beginning at the respective time of day and based on the time to departure data, determining a time to departure probability prediction indicative of a probability of the departure via the public transport at the departure location satisfying a predefined temporal threshold.

In an example embodiment, the determining the time to departure probability prediction comprises aggregating the time to departure data for traveler journeys beginning at the starting location throughout an interval of time that includes the respective time of day. In another example embodiment, the determining the time to departure probability prediction comprises aggregating the time to departure data for traveler journeys for other travelers that also begin at the starting location during the interval of time. In an example embodiment, the computer-implemented method also includes mapping the time to departure data onto a map data layer of an isoline map.

In another example embodiment, the determining the transit time data comprises determining the transit time based on a transit mode for a navigation route between the starting location and the departure location. In another example embodiment, the determining the transit time data comprises determining the transit time data based on historical transit time data for a navigation route between the starting location and the departure location. In another example embodiment, the determining the transit time data comprises determining the transit time data based on user profile data associated with a request to determine the time to departure data for the departure location associated with the public transport. In another example embodiment, the determining the transit time data comprises determining the transit time data based on environmental data for the starting location.

In another example embodiment, the determining the waiting time data comprises determining the waiting time data utilizing a machine learning model configured for waiting time prediction for the departure location. In another example embodiment, the determining the waiting time data comprises determining the waiting time data based on public transport timetable data.

In another example embodiment, an apparatus is configured for quantifying public transport coverage. The apparatus includes processing circuitry and at least one memory including computer program code instructions that are configured to, when executed by the processing circuitry, cause the apparatus to, for a traveler journey beginning at a starting location at a respective time of day, determine transit time data indicative of a predicted amount of time to travel between the starting location and a departure location associated with a public transport boarding location for a public transport. The computer program code instructions are also configured to, when executed by the processing circuitry, cause the apparatus to determine waiting time data indicative of a predicted amount of time to wait at the departure location prior to departure via the public transport for the traveler journey beginning at the respective time of day. The computer program code instructions are also configured to, when executed by the processing circuitry, cause the apparatus to compute, based on a combination of the transit time data and the waiting time data, time to departure data indicative of a predicted amount of time until departure via the public transport at the departure location. The computer program code instructions are also configured to, when executed by the processing circuitry, cause the apparatus to, for the traveler journey beginning at the respective time of day and based on the time to departure data, determine a time to departure probability prediction indicative of a probability of the departure via the public transport at the departure location satisfying a predefined temporal threshold.

In another example embodiment, the computer program code instructions are also configured to, when executed by the processing circuitry, cause the apparatus to aggregate the time to departure data for traveler journeys beginning at the starting location throughout an interval of time that includes the respective time of day. In another example embodiment, the computer program code instructions are also configured to, when executed by the processing circuitry, cause the apparatus to aggregate the time to departure data for traveler journeys for other travelers that also begin at the starting location during the interval of time. In another example embodiment, the computer program code instructions are also configured to, when executed by the processing circuitry, cause the apparatus to map the time to departure data onto a map data layer of an isoline map.

In another example embodiment, the transit time data is determined based on a transit mode for a navigation route between the starting location and the departure location. In another example embodiment, the transit time data is determined based on historical transit time data for a navigation route between the starting location and the departure location. In another example embodiment, the transit time data is determined based on user profile data associated with a request to determine the time to departure data for the departure location associated with the public transport. In another example embodiment, the transit time data is determined based on environmental data for the starting location.

In another example embodiment, the computer program code instructions are also configured to, when executed by the processing circuitry, cause the apparatus to utilize a machine learning model configured for waiting time prediction for the departure location to determine the waiting time data.

In another example embodiment, the computer program code instructions are also configured to, when executed by the processing circuitry, cause the apparatus to determine the waiting time data based on public transport timetable data.

In another example embodiment, a computer program product is provided to quantify public transport coverage. The computer program product includes at least one non-transitory computer readable storage medium having computer-executable program code instructions stored therein with the computer-executable program code instructions including program code instructions configured, upon execution, to, for a traveler journey beginning at a starting location at a respective time of day, determine transit time data indicative of a predicted amount of time to travel between the starting location and a departure location associated with a public transport boarding location for a public transport. The computer-executable program code instructions are also configured to determine waiting time data indicative of a predicted amount of time to wait at the departure location prior to departure via the public transport for the traveler journey beginning at the respective time of day. The computer-executable program code instructions are also configured to compute, based on a combination of the transit time data and the waiting time data, time to departure data indicative of a predicted amount of time until departure via the public transport at the departure location. Furthermore, the computer-executable program code instructions are configured to, for the traveler journey beginning at the respective time of day and based on the time to departure data, determine a time to departure probability prediction indicative of a probability of the departure via the public transport at the departure location satisfying a predefined temporal threshold.

In another example embodiment, the computer-executable program code instructions are also configured to aggregate the time to departure data for traveler journeys beginning at the starting location throughout an interval of time that includes the respective time of day. In another example embodiment, the computer-executable program code instructions are also configured to aggregate the time to departure data for traveler journeys for other travelers that also begin at the starting location during the interval of time. In another example embodiment, the computer-executable program code instructions are also configured to map the time to departure data onto a map data layer of an isoline map.

In another example embodiment, the transit time data is determined based on a transit mode for a navigation route between the starting location and the departure location. In another example embodiment, the transit time data is determined based on historical transit time data for a navigation route between the starting location and the departure location. In another example embodiment, the transit time data is determined based on user profile data associated with a request to determine the time to departure data for the departure location associated with the public transport. In another example embodiment, the transit time data is determined based on environmental data for the starting location.

In another example embodiment, the computer-executable program code instructions are also configured to utilize a machine learning model configured for waiting time prediction for the departure location to determine the waiting time data.

In another example embodiment, the computer-executable program code instructions are also configured to determine the waiting time data based on public transport timetable data.

In another example embodiment, an apparatus is provided that includes means for determining, for a traveler journey beginning at a starting location at a respective time of day, transit time data indicative of a predicted amount of time to travel between the starting location and a departure location associated with a public transport boarding location for a public transport. The apparatus of this example embodiment also includes means for determining waiting time data indicative of a predicted amount of time to wait at the departure location prior to departure via the public transport for the traveler journey beginning at the respective time of day. The apparatus of this example embodiment also includes means for computing, based on a combination of the transit time data and the waiting time data, time to departure data indicative of a predicted amount of time until departure via the public transport at the departure location. The apparatus of this example embodiment also includes means for determining, for the traveler journey beginning at the respective time of day and based on the time to departure data, a time to departure probability prediction indicative of a probability of the departure via the public transport at the departure location satisfying a predefined temporal threshold.

In an example embodiment, the determining the time to departure probability prediction comprises aggregating the time to departure data for traveler journeys beginning at the starting location throughout an interval of time that includes the respective time of day. In another example embodiment, the determining the time to departure probability prediction comprises aggregating the time to departure data for traveler journeys for other travelers that also begin at the starting location during the interval of time. In an example embodiment, the computer-implemented method also includes mapping the time to departure data onto a map data layer of an isoline map.

In another example embodiment, the means for determining the transit time data comprises means for determining the transit time based on a transit mode for a navigation route between the starting location and the departure location. In another example embodiment, the means for determining the transit time data comprises means for determining the transit time data based on historical transit time data for a navigation route between the starting location and the departure location. In another example embodiment, the means for determining the transit time data comprises means for determining the transit time data based on user profile data associated with a request to determine the time to departure data for the departure location associated with the public transport. In another example embodiment, the means for determining the transit time data comprises means for determining the transit time data based on environmental data for the starting location.

In another example embodiment, the means for determining the waiting time data comprises means for determining the waiting time data utilizing a machine learning model configured for waiting time prediction for the departure location. In another example embodiment, the means for determining the waiting time data comprises means for determining the waiting time data based on public transport timetable data.

In an example embodiment, a computer-implemented method is provided for quantifying public transport coverage. The computer-implemented method includes generating a request for time to departure data for a departure location associated with public transport, the time to departure data being based on a combination of: (i) transit time data indicative of a predicted amount of time to travel between a starting location and the departure location and (ii) waiting time data indicative of a predicted amount of time to wait at the departure location prior to departure via the public transport for a traveler journey beginning at a respective time of day. The computer-implemented method also includes, in response to the request, receiving time to departure probability prediction data for a plurality of geographical regions, the time to departure probability prediction data indicative of a probability of a departure from the departure location via the public transport satisfying a predefined temporal threshold for the traveler journey beginning at the respective time of day from the starting location within a respective geographical region. Furthermore, the computer-implemented method includes rendering a visual representation of the time to departure probability prediction data for the respective regions via a user interface.

In an example embodiment, the request comprises the respective time of day and the time to departure probability prediction data for the respective geographical region is dependent up on the respective time of day. In an example embodiment, the request comprises a transit mode for a navigation route between the respective regions and the departure location, and the time to departure probability prediction data for the respective geographical region is dependent upon the transit mode. In an example embodiment, the request is associated with a particular traveler and the time to departure probability prediction data for the respective geographical region is dependent up on user profile data for the respective traveler. In an example embodiment, the rendering the visual representation of the time to departure probability prediction data for the respective geographical region comprises rendering the visual representation of the time to departure probability prediction data for the respective geographical region via a display of a computing device.

In another example embodiment, an apparatus is configured for quantifying public transport coverage. The apparatus includes processing circuitry and at least one memory including computer program code instructions that are configured to, when executed by the processing circuitry, cause the apparatus to generate a request for time to departure data for a departure location associated with public transport, the time to departure data being based on a combination of: (i) transit time data indicative of a predicted amount of time to travel between a starting location and the departure location and (ii) waiting time data indicative of a predicted amount of time to wait at the departure location prior to departure via the public transport for a traveler journey beginning at a respective time of day. The computer program code instructions are also configured to, when executed by the processing circuitry, cause the apparatus to, in response to the request, receive time to departure probability prediction data for a plurality of geographical regions, the time to departure probability prediction data indicative of a probability of a departure from the departure location via the public transport satisfying a predefined temporal threshold for the traveler journey beginning at the respective time of day from the starting location within a respective geographical region. The computer program code instructions are also configured to, when executed by the processing circuitry, cause the apparatus to render a visual representation of the time to departure probability prediction data for the respective regions via a user interface.

In an example embodiment, the request comprises the respective time of day and the time to departure probability prediction data for the respective geographical region is dependent up on the respective time of day. In an example embodiment, the request comprises a transit mode for a navigation route between the respective regions and the departure location, and the time to departure probability prediction data for the respective geographical region is dependent upon the transit mode. In an example embodiment, the request is associated with a particular traveler and the time to departure probability prediction data for the respective geographical region is dependent up on user profile data for the respective traveler. In another example embodiment, the computer program code instructions are also configured to, when executed by the processing circuitry, cause the apparatus to render the visual representation of the time to departure probability prediction data for the respective geographical region via a display of a computing device.

In another example embodiment, a computer program product is provided to quantify public transport coverage. The computer program product includes at least one non-transitory computer readable storage medium having computer-executable program code instructions stored therein with the computer-executable program code instructions including program code instructions configured, upon execution, to generate a request for time to departure data for a departure location associated with public transport, the time to departure data being based on a combination of: (i) transit time data indicative of a predicted amount of time to travel between a starting location and the departure location and (ii) waiting time data indicative of a predicted amount of time to wait at the departure location prior to departure via the public transport for a traveler journey beginning at a respective time of day. The computer-executable program code instructions are also configured to, in response to the request, receive time to departure probability prediction data for a plurality of geographical regions, the time to departure probability prediction data indicative of a probability of a departure from the departure location via the public transport satisfying a predefined temporal threshold for the traveler journey beginning at the respective time of day from the starting location within a respective geographical region. The computer-executable program code instructions are also configured to render a visual representation of the time to departure probability prediction data for the respective regions via a user interface.

In an example embodiment, the request comprises the respective time of day and the time to departure probability prediction data for the respective geographical region is dependent up on the respective time of day. In an example embodiment, the request comprises a transit mode for a navigation route between the respective regions and the departure location, and the time to departure probability prediction data for the respective geographical region is dependent upon the transit mode. In an example embodiment, the request is associated with a particular traveler and the time to departure probability prediction data for the respective geographical region is dependent up on user profile data for the respective traveler. In another example embodiment, the computer-executable program code instructions are also configured to render the visual representation of the time to departure probability prediction data for the respective geographical region via a display of a computing device.

In another example embodiment, an apparatus is provided that includes means for generating a request for time to departure data for a departure location associated with public transport, the time to departure data being based on a combination of: (i) transit time data indicative of a predicted amount of time to travel between a starting location and the departure location and (ii) waiting time data indicative of a predicted amount of time to wait at the departure location prior to departure via the public transport for a traveler journey beginning at a respective time of day. The apparatus of this example embodiment also includes, in response to the request, receiving time to departure probability prediction data for a plurality of geographical regions, means for receiving time to departure probability prediction data for a plurality of geographical regions, the time to departure probability prediction data indicative of a probability of a departure from the departure location via the public transport satisfying a predefined temporal threshold for the traveler journey beginning at the respective time of day from the starting location within a respective geographical region. The apparatus of this example embodiment also includes means for rendering a visual representation of the time to departure probability prediction data for the respective regions via a user interface.

In an example embodiment, the request comprises the respective time of day and the time to departure probability prediction data for the respective geographical region is dependent up on the respective time of day. In an example embodiment, the request comprises a transit mode for a navigation route between the respective regions and the departure location, and the time to departure probability prediction data for the respective geographical region is dependent upon the transit mode. In an example embodiment, the request is associated with a particular traveler and the time to departure probability prediction data for the respective geographical region is dependent up on user profile data for the respective traveler. In an example embodiment, the means for rendering the visual representation of the time to departure probability prediction data for the respective geographical region comprises means for rendering the visual representation of the time to departure probability prediction data for the respective geographical region via a display of a computing device.

BRIEF DESCRIPTION OF THE DRAWINGS

Figure 1:
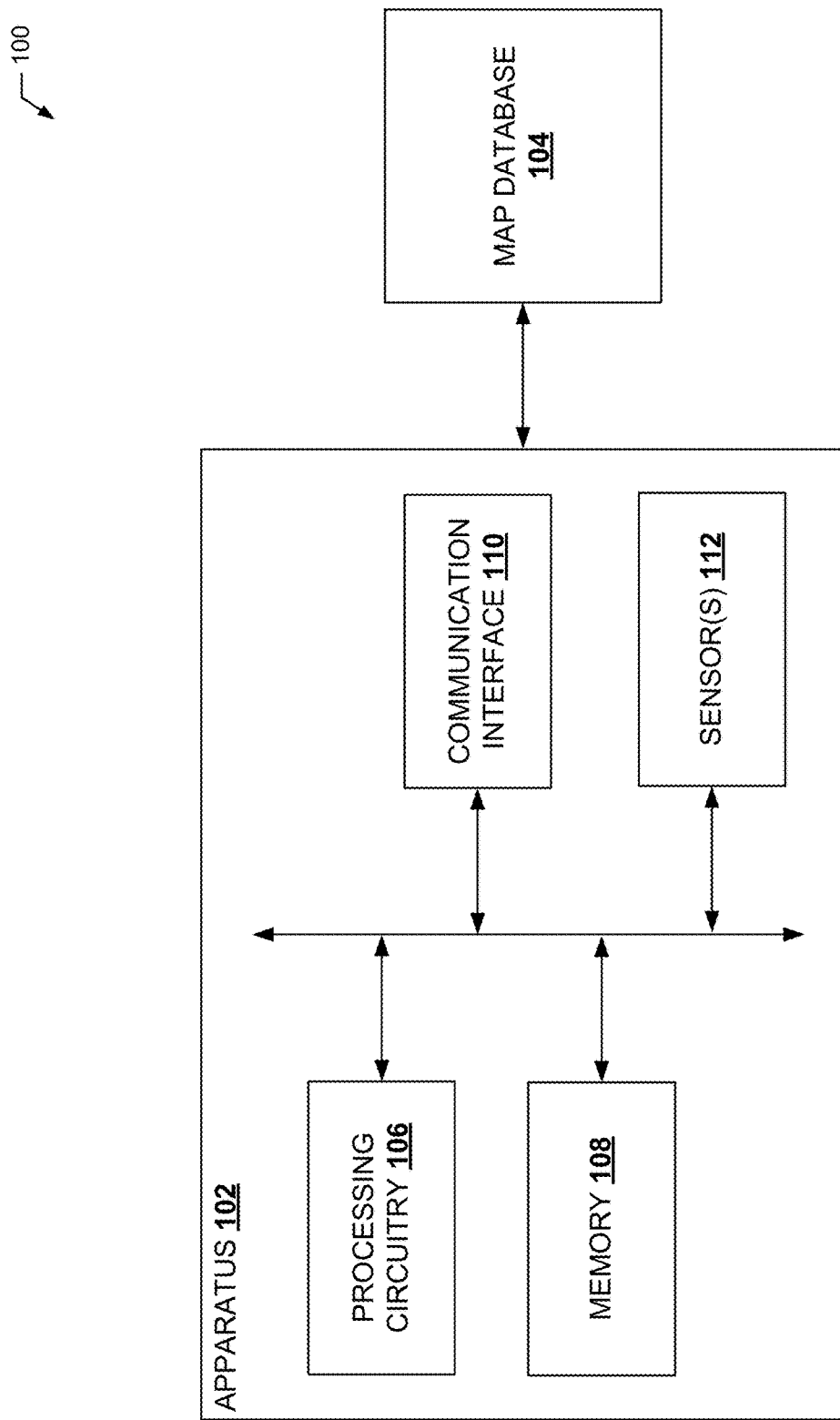
Figure 2:
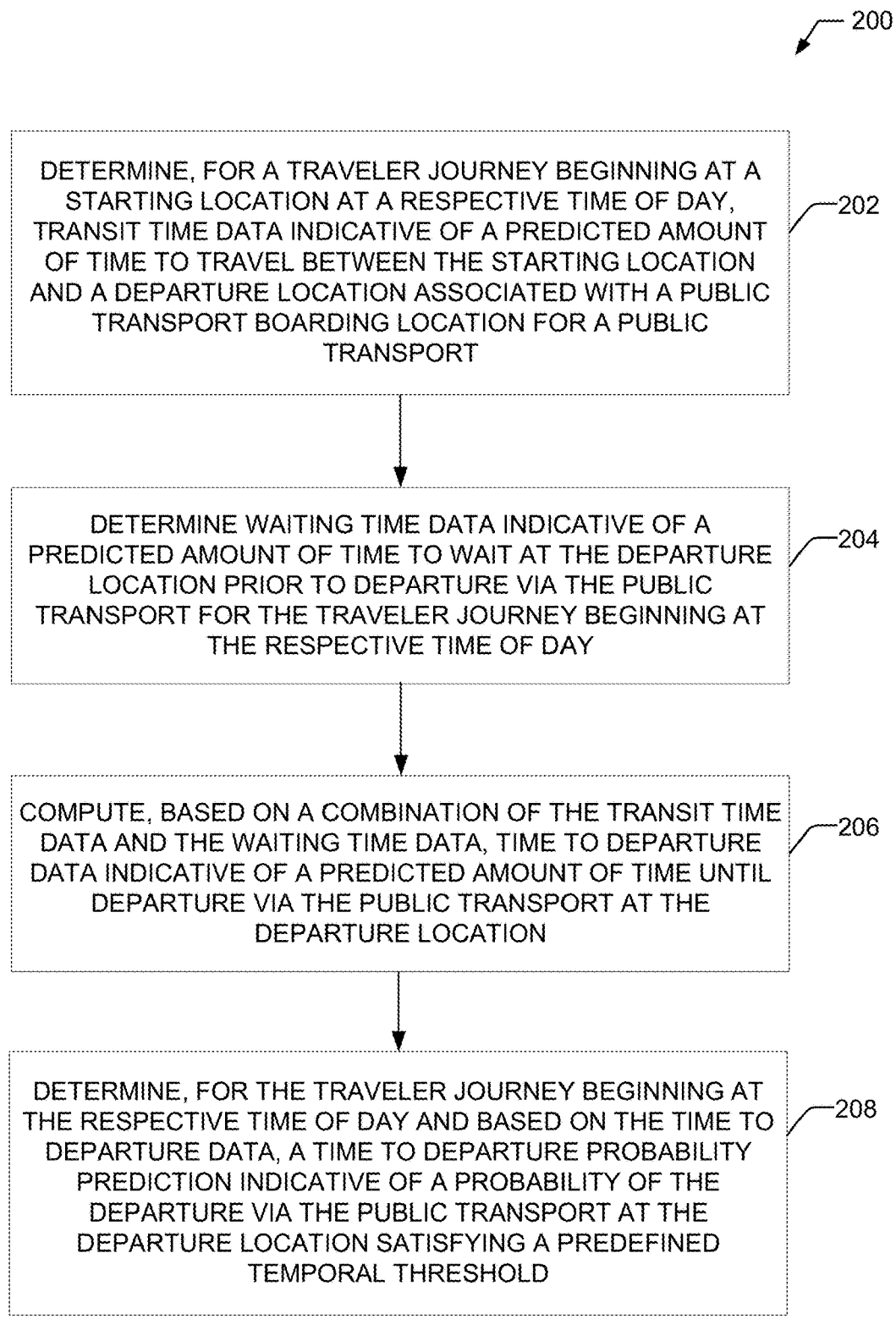
Figure 3:
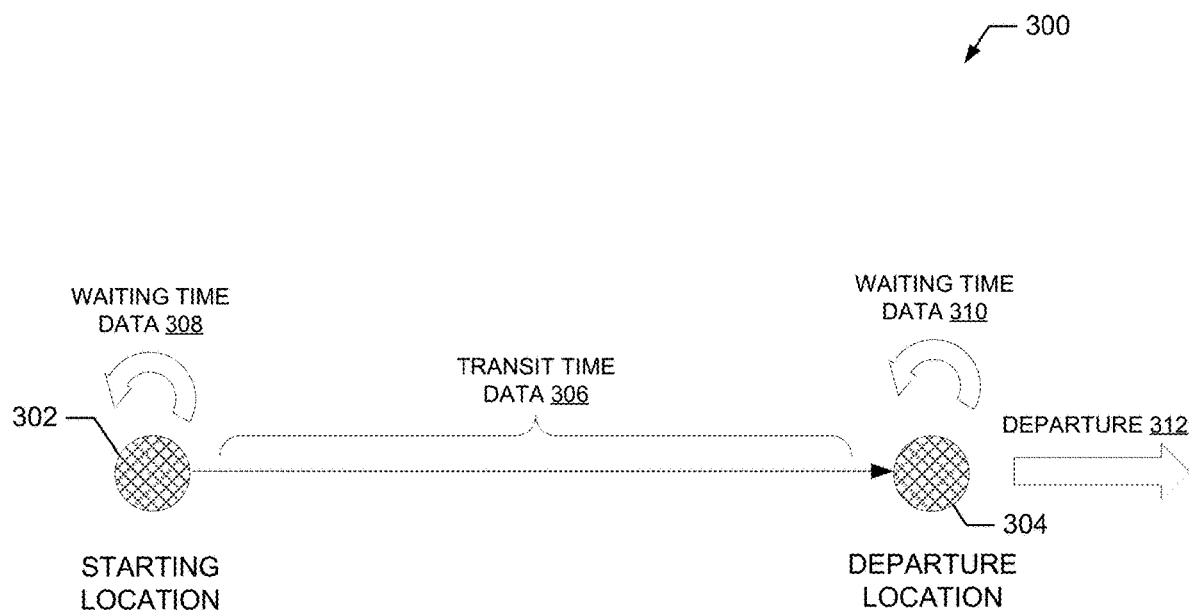
Figure 4:
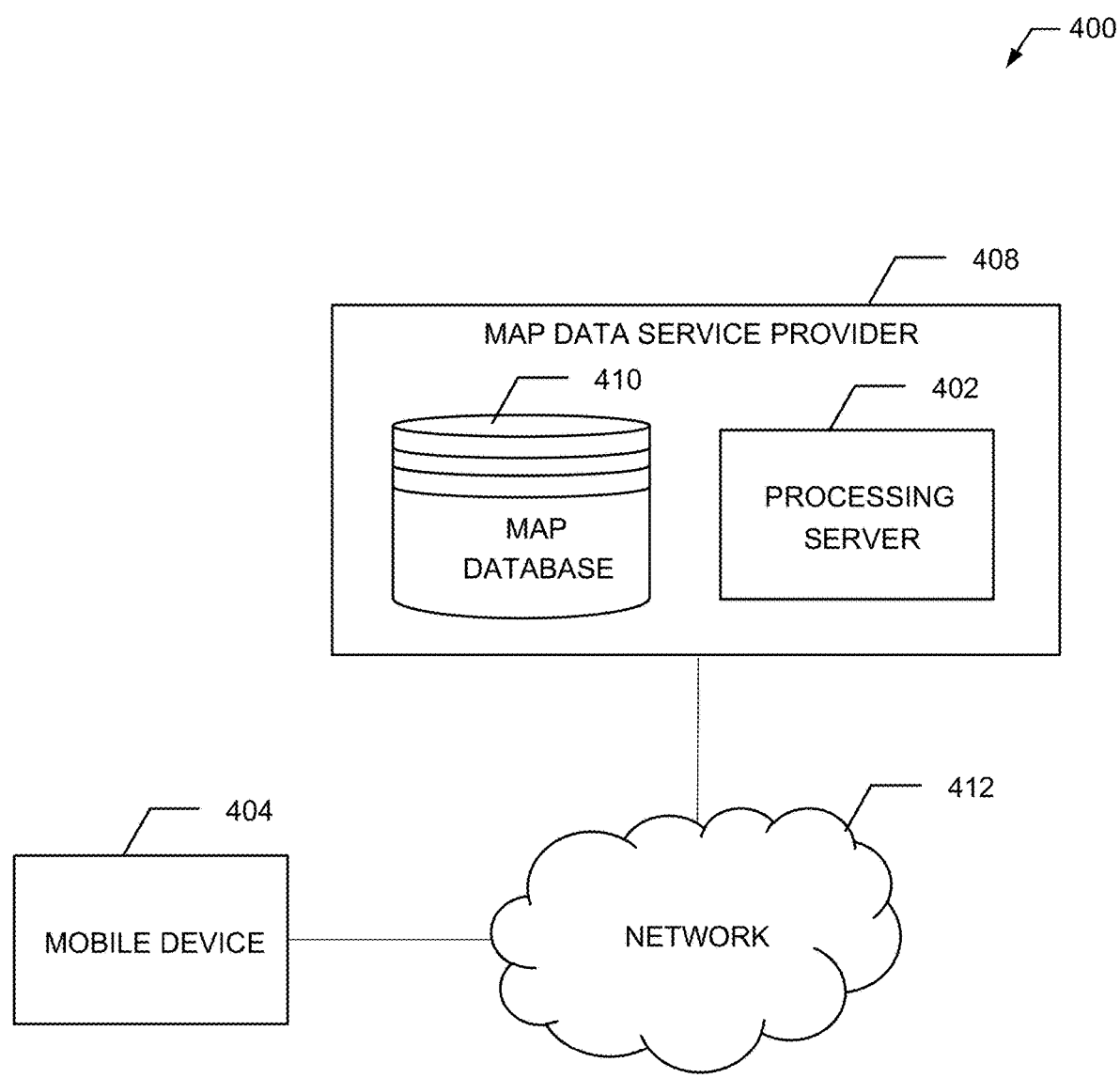
Figure 5:
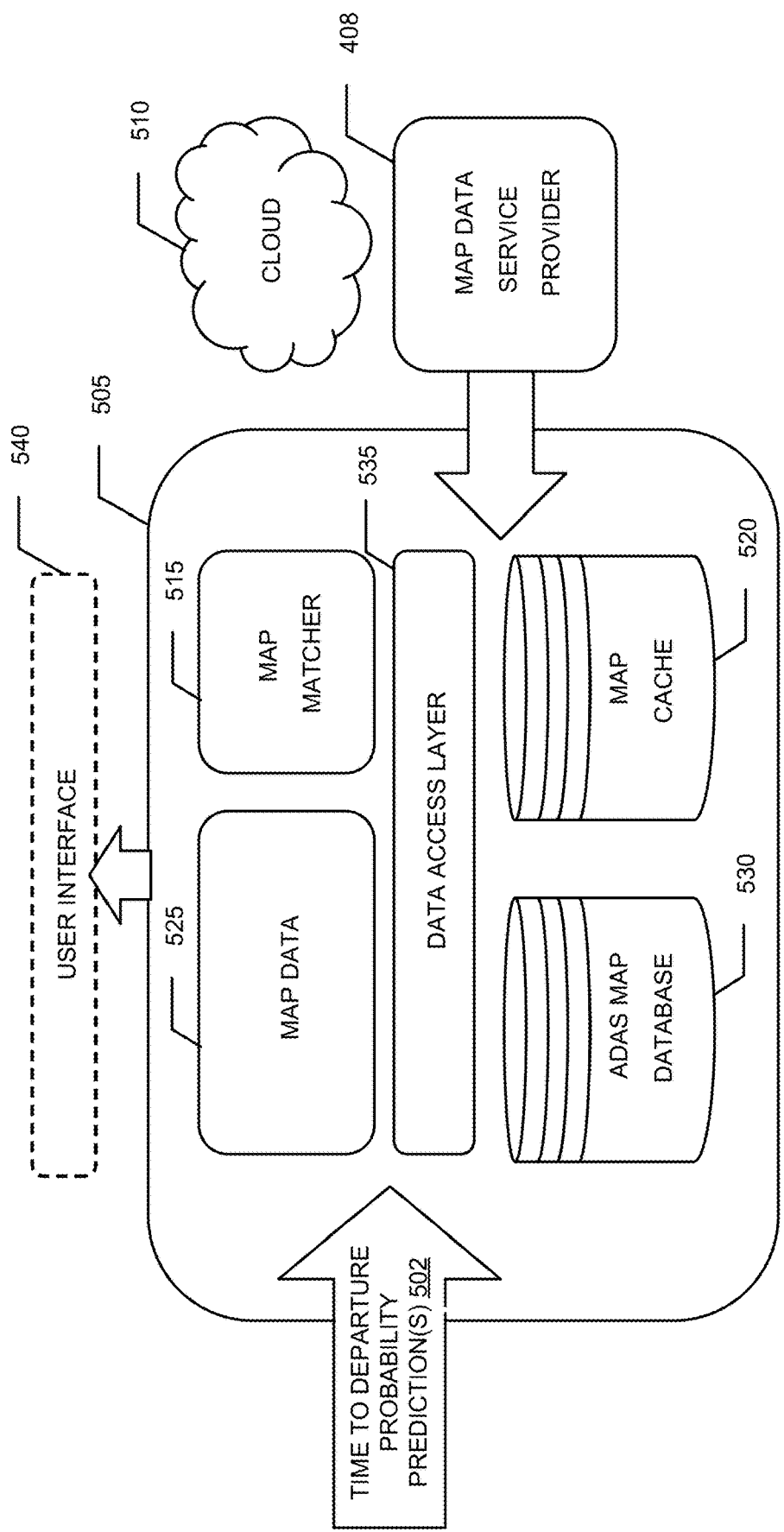

Having thus described certain embodiments of the disclosure in general terms, reference will now be made to the accompanying drawings, which are not necessarily drawn to scale, and wherein:

FIG. 1 is a block diagram of a system including an apparatus for quantifying public transport coverage in accordance with one or more example embodiments of the present disclosure;

FIG. 2 is a flowchart illustrating operations performed, such as by the apparatus of FIG. 1, in order to provide for quantifying public transport coverage in accordance with one or more example embodiments of the present disclosure;

FIG. 3 illustrates a diagram associated with predicted time to departure data in accordance with one or more example embodiments of the present disclosure;

FIG. 4 is a block diagram of a system to facilitate generation of map data in accordance with one or more example embodiments of the present disclosure; and FIG. 5 is an example embodiment of an architecture specifically configured for implementing embodiments described herein.

Figure 6:
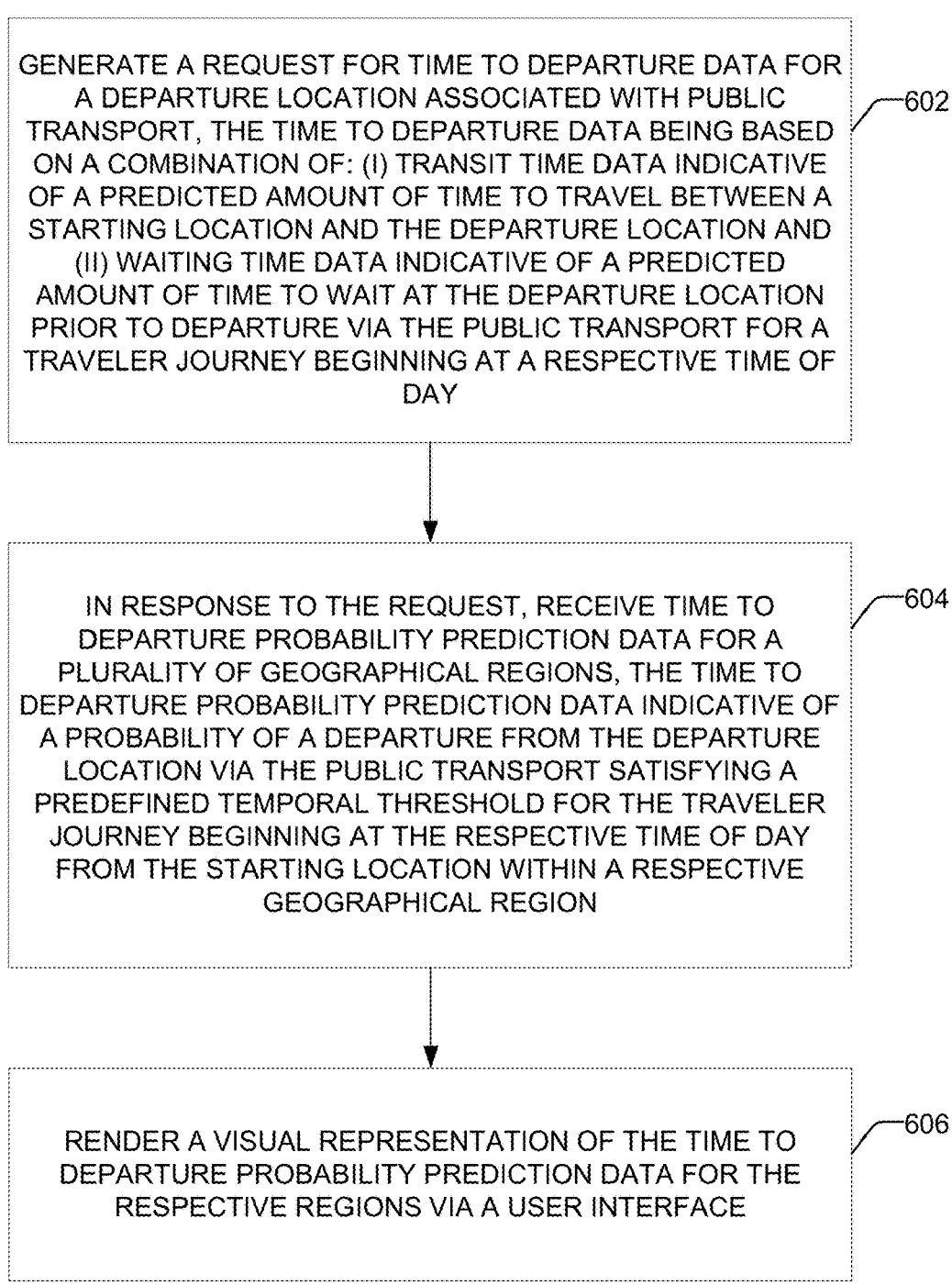
Figure 7:
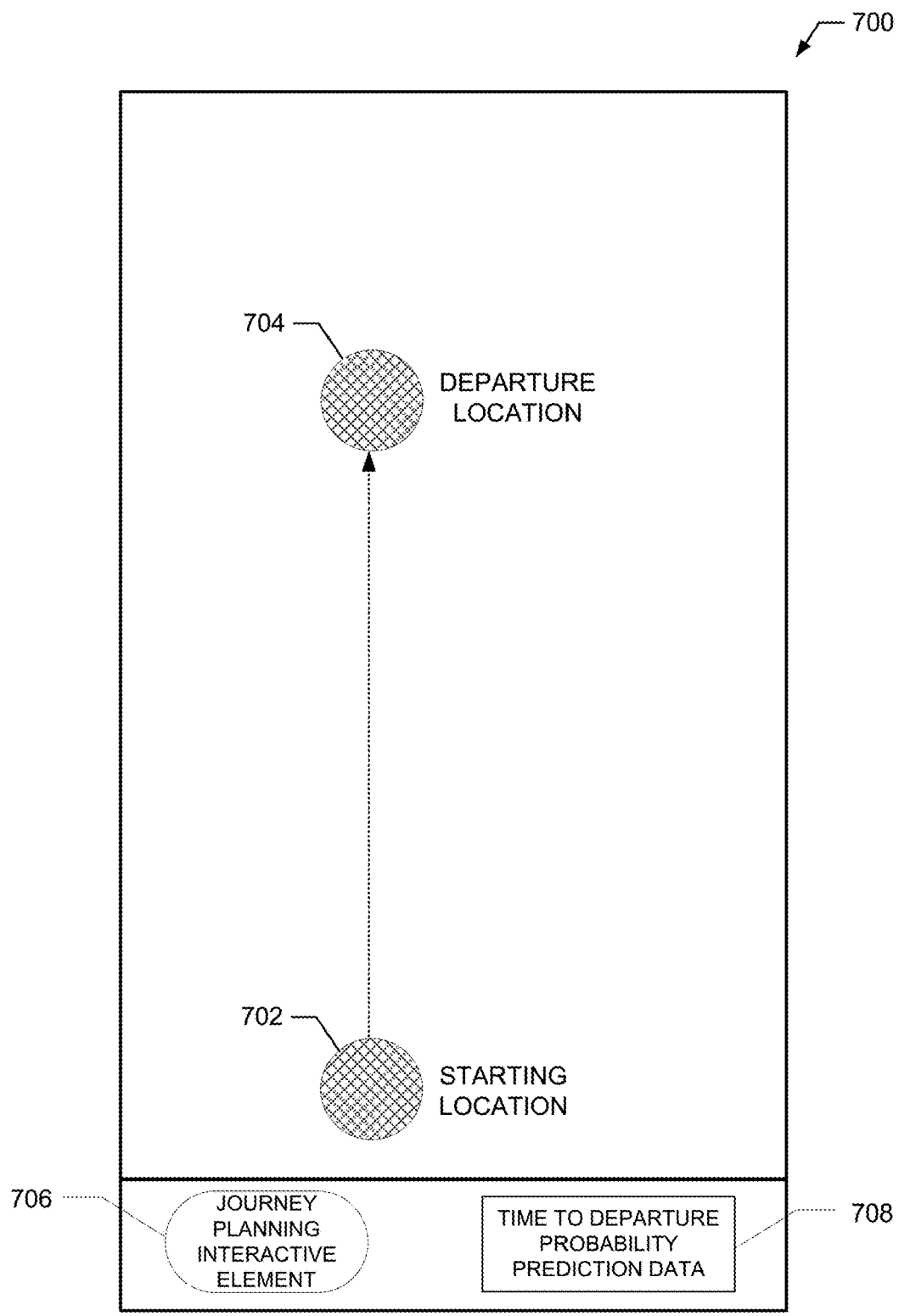
Figure 8:
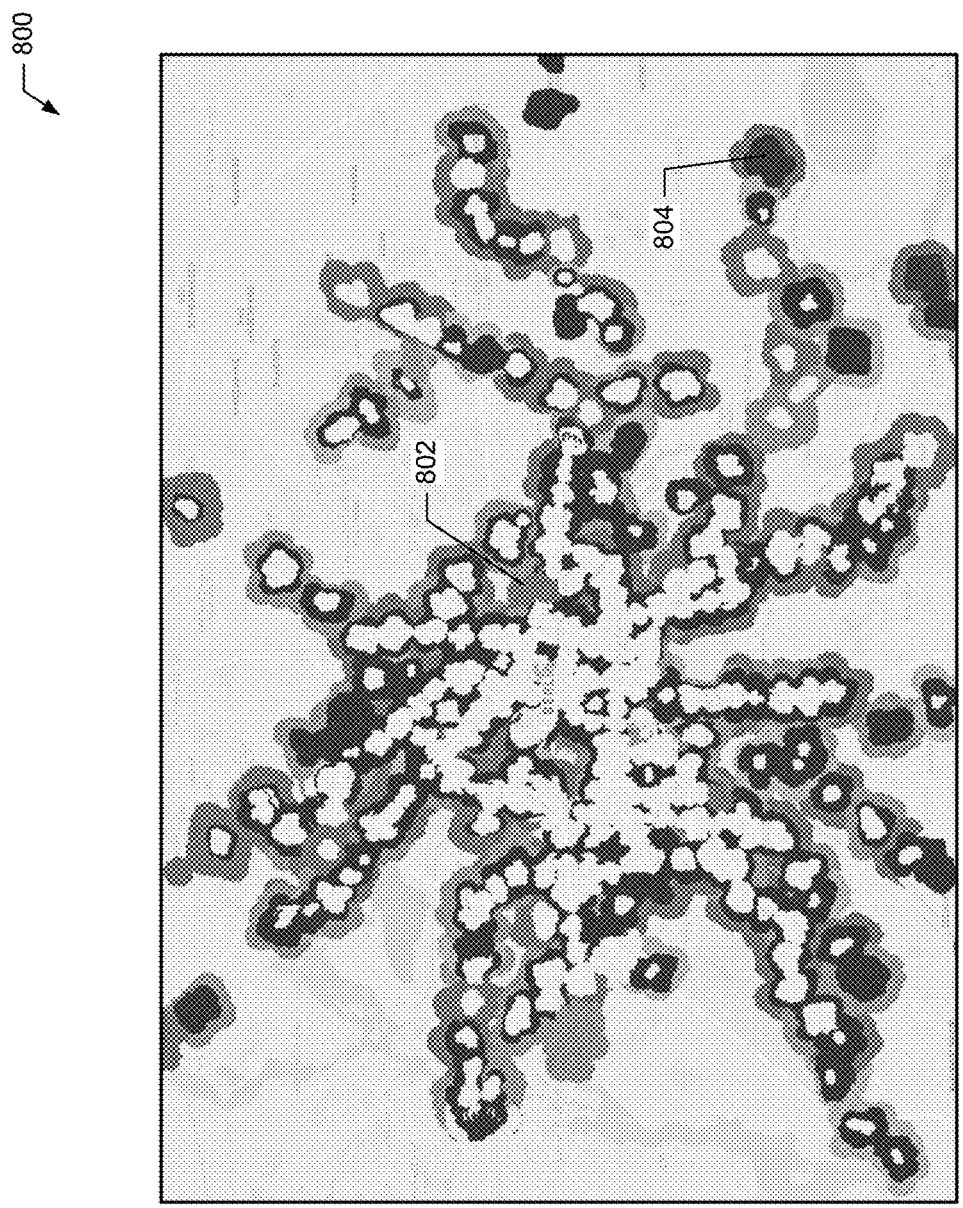
Figure 9:
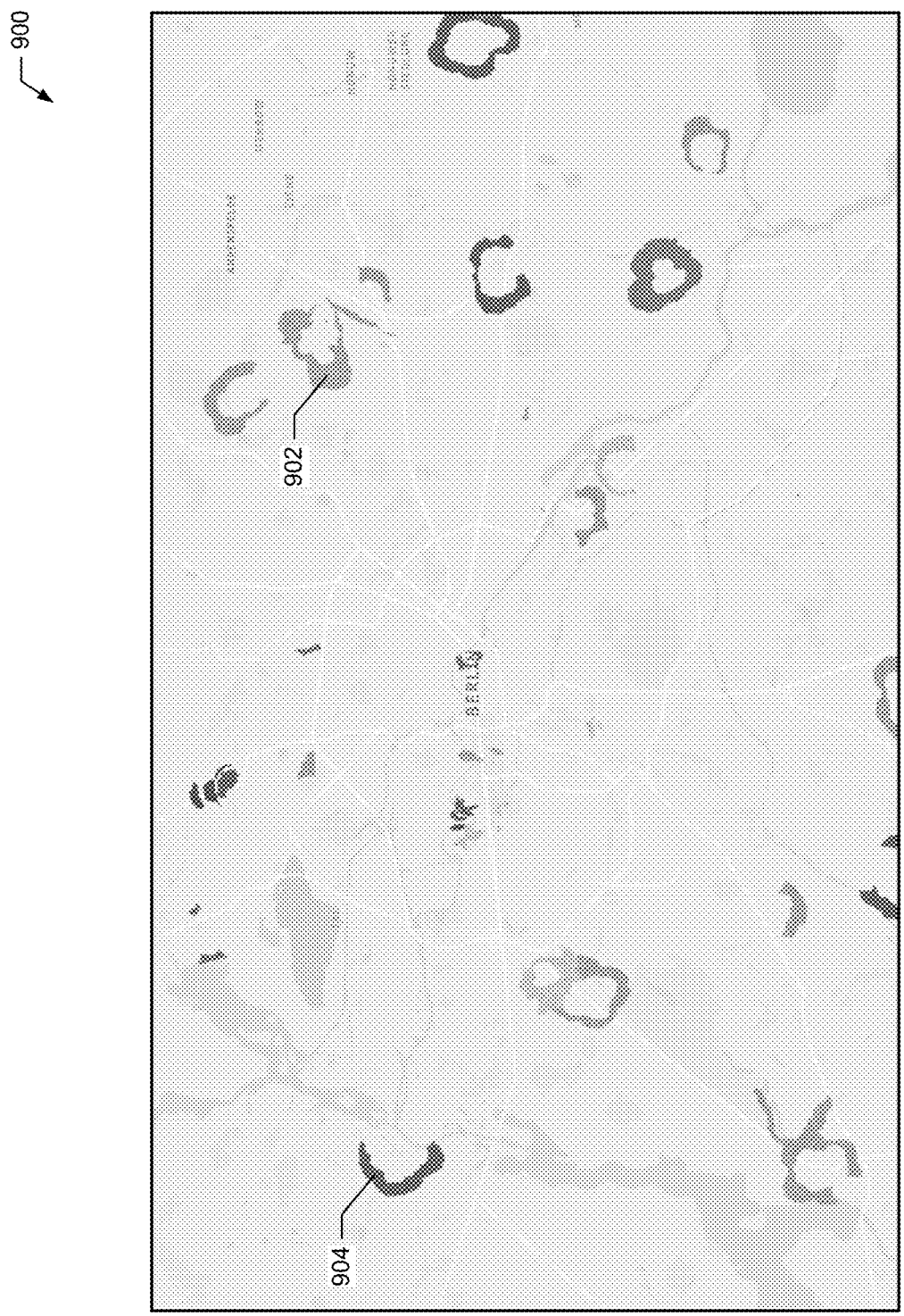

FIG. 6 is another flowchart illustrating operations performed, such as by the apparatus of FIG. 1, in order to provide for quantifying public transport coverage in accordance with one or more example embodiments of the present disclosure;

FIG. 7 illustrates exemplary user interface in accordance with one or more example embodiments of the present disclosure;

FIG. 8 illustrates another exemplary user interface in accordance with one or more example embodiments of the present disclosure; and FIG. 9 illustrates another exemplary user interface in accordance with one or more example embodiments of the present disclosure.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure can be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms can be used interchangeably to refer to data capable of being transmitted, received and/or stored in accordance with embodiments of the present disclosure. Thus, use of any such terms should not be taken to limit the spirit and scope of embodiments of the present disclosure.

Navigation systems typically determine timing information for a navigation route based on static information such as, for example, distance between a starting location and a destination location. However, navigation systems are typically unable to accurately determine timing information for a navigation route when multiple transit modes (e.g., walking and public transport) are employed for a navigation route. For example, a navigation system can determine that a pedestrian at a starting location is 1 kilometer from a public transport stop and that walking to the public transport stop from the starting location typically takes about 10 minutes. However, commuting via public transport typically involves a certain amount of waiting time for a pedestrian at a public transport stop. Furthermore, estimating a waiting time for a pedestrian at a public transport stop is typically difficult since the waiting time depends on an arrival time of the pedestrian at the public transport stop, dynamic public transport schedules (e.g., frequency of departure of a public transport, etc.), factors related to the particular type of public transport, interaction of the pedestrian with the public transport, and/or other factors. Therefore, there are numerous challenges related to determining timing information for a navigation route provided by a navigation system To address these and/or other issues, a method, apparatus and computer program product are provided in accordance with an example embodiment in order to quantify public transport coverage for one or more locations based on predicted time to departure data. In one or more embodiments, public transport coverage for a location is quantified by computing time to departure data based on dynamic timetable data for a public transport. For example, rather than employing static data related to how far a starting location is from a public transport stop, dynamic data related to public transport schedules can be employed. Additionally, in certain embodiments, dynamic data related to a transport mode to the public transport stop can be employed. As such, a waiting time at a public transport stop can be more accurately predicted (e.g., rather than merely employing a static distance between a starting location and a public transport stop). In one or more embodiments, the dynamic data and/or the waiting time prediction can be employed to quantify public transport coverage per location at a given point in time. Alternatively, in one or more embodiments, the dynamic data and/or the waiting time prediction can be employed to quantify public transport coverage per location over a set of time widows based aggregated data such. For example, a percentage of time a given location is within X minutes of a departure via a public transport can be determined, where X is an integer. In another example, an average amount of time until a departure via a public transport from a given location can be determined. In yet another example, it can be determined, with a certain degree of certainty (e.g., 90%), that a user at a given location will be able to depart via a public transport within a certain amount of time (e.g., 10 minutes). A public transport includes, for example, a train, a bus, a subway train, a railcar, a rapid transit vehicle, a tram, a ride service vehicle, a shared vehicle, a taxi, an on-demand vehicle, a plane, and/or another public transport entity.

In certain embodiments, public transport coverage per location can be quantified by mapping predicted time to departure data onto one or more mapping layers of an isoline map. The predicted time to departure data can be generated based on the waiting time prediction and a predicted time for transit to a public transport location. In certain embodiments, predicted time to departure data can be computed in relation to a given public transport station. In certain embodiments, predicted time to departure data can be aggregated across multiple public transport stations (e.g., across multiple public transport stations within a certain distance from a starting location).

In certain embodiments, predicted time to departure data for a given location can be computed based on dynamic public transport timetable data. In certain embodiments, a map (e.g., an isoline map, etc.) for a user interface can illustrate geographical regions with similar time to departure for a given time. In certain embodiments, a map (e.g., an isoline map, etc.) for a user interface can highlight geographical regions that do not satisfy certain public transport criteria such as, for example, being, on average, within 10 minutes of a departing public transport (e.g., departing trains). In certain embodiments, rarely employed public transport stops (e.g., buses with a 30-minute departing frequency, etc.) can be removed from a map (e.g., an isoline map, etc.) for a user interface. In certain embodiments, a user interface can provide query capabilities for quantifying public transport coverage for a given location. For example, a query can provide a request for a navigation system to find all locations in a city which have a current time to departure above 10 minutes.

In certain embodiments, predicted time to departure data can correspond to a specific time of day (e.g., 3 pm). In certain embodiments, predicted time to departure data can quantify public transport coverage of a location by aggregating individual time to departure values for a given time widow. A time window can include an entire day (e.g., a 24 hour time interval), service hours for a public transport stop (e.g., a time interval between 5 am and 11 pm), a commute window (e.g., 5 am to 10 am, 4 pm to 7 pm, etc.), or another interval of time. In certain embodiments, individual time to departure values for a given time widow can be aggregated based on an average time to departure. In certain embodiments, individual time to departure values for a given time widow can be aggregated based on a percentage of time that a location is within X minutes of departure from public transport location.

According to one or more embodiments, the predicted time to departure data can be uploaded to a mapping server. Furthermore, in certain embodiments, the predicted time to departure data can be aggregated into information to facilitate mapping, routing and/or navigation for location services. In certain embodiments, the predicted time to departure data can be employed to determine geographical regions which are generally far (e.g., greater than a certain time to departure value) from a departure location for a public transport.

Accordingly, predicted time to departure data can be employed to provide improved mapping, routing and/or navigation for location services. In certain embodiments, predicted time to departure data can be employed to determine candidate geographical regions for disposing ride sharing services and/or on-demand vehicles (e.g., as consumers can be more likely to desire a ride sharing service and/or an on-demand vehicle versus employing a public transport station in light of predicted time to departure data). In certain embodiments, predicted time to departure data can be employed to determine geographic regions with optimal public transport services with respect to certain user criteria and/or service criteria. Additionally or alternatively, predicted time to departure data can be employed to provide improved user interfaces associated with mapping, routing and/or navigation. For example, in one or more embodiments, predicted time to departure data can reduce a number of queries and/or a number of displays associated with a user interfaces employed for mapping, routing and/or navigation.

In certain embodiments, a visualization of the predicted time to departure data can be provided via a user interface in an optimal manner to reduce a number of queries and/or a number of displays for the user interface. Computational resources for a computing device associated with the user interface (e.g., the user interface related to mapping, routing and/or navigation) can also be conserved.

With reference to FIG. 1, a system 100 configured to quantify public transport coverage for one or more locations based on predicted time to departure data is depicted, in accordance with one or more embodiments of the present disclosure. In the illustrated embodiment, the system 100 includes an apparatus 102 and a map database 104. As described further below, the apparatus 102 is configured in accordance with an example embodiment of the present disclosure to assist mapping, routing and/or navigation for location services. The apparatus 102 can be embodied by any of a wide variety of systems and/or computing devices including, for example, server system, a cloud-based computing system, a location service system (e.g., a location data and technology platform system, a cloud-based location platform service system, etc.), an urban mobility system, a navigation system, routing system, a mapping system, a consumer device system, a vehicle system, a transportation system, a control system, an electronic control unit, an autonomous vehicle control system, an Advanced Driver Assistance System module (ADAS of a vehicle), or any other type of computing device carried by or remote from the vehicle including, for example, a server or a distributed network of computing devices. In certain embodiments, the apparatus 102 may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. Regardless of the type of computing device and/or system that embodies the apparatus 102, the apparatus 102 of an example embodiment includes, is associated with or otherwise is in communication with processing circuitry 106, memory 108 and optionally a communication interface 110.

In some embodiments, the processing circuitry 106 (and/or co-processors or any other processors assisting or otherwise associated with the processing circuitry 106) can be in communication with the memory 108 via a bus for passing information among components of the apparatus 102. The memory 108 can be non-transitory and can include, for example, one or more volatile and/or non-volatile memories. In other words, for example, the memory 108 may be an electronic storage device (for example, a computer readable storage medium) comprising gates configured to store data (for example, bits) that can be retrievable by a machine (for example, a computing device like the processing circuitry 106). The memory 108 can be configured to store information, data, content, applications, instructions, or the like for enabling the system 100 to carry out various functions in accordance with an example embodiment of the present disclosure. For example, the memory 108 can be configured to buffer input data for processing by the processing circuitry 106. Additionally or alternatively, the memory 108 can be configured to store instructions for execution by the processing circuitry 106.

The processing circuitry 106 can be embodied in a number of different ways. For example, the processing circuitry 106 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 106 can include one or more processing cores configured to perform independently. A multi-core processor can enable multiprocessing within a single physical package. Additionally or alternatively, the processing circuitry 106 can include one or more processors configured in tandem via the bus to enable independent execution of instructions, pipelining and/or multithreading.

In an example embodiment, the processing circuitry 106 can be configured to execute instructions stored in the memory 108 or otherwise accessible to the processing circuitry 106. Alternatively or additionally, the processing circuitry 106 can be configured to execute hard coded functionality. As such, whether configured by hardware or software methods, or by a combination thereof, the processing circuitry 106 can represent an entity (for example, physically embodied in circuitry) capable of performing operations according to an embodiment of the present disclosure while configured accordingly. Thus, for example, when the processing circuitry 106 is embodied as an ASIC, FPGA or the like, the processing circuitry 106 can be specifically configured hardware for conducting the operations described herein. Alternatively, as another example, when the processing circuitry 106 is embodied as an executor of software instructions, the instructions can specifically configure the processing circuitry 106 to perform the algorithms and/or operations described herein when the instructions are executed. However, in some cases, the processing circuitry 106 can be a processor of a specific device (for example, a computing device) configured to employ an embodiment of the present disclosure by further configuration of the processor by instructions for performing the algorithms and/or operations described herein. The processing circuitry 106 can include, among other things, a clock, an arithmetic logic unit (ALU) and/or one or more logic gates configured to support operation of the processing circuitry 106.

The apparatus 102 of an example embodiment can also optionally include the communication interface 110 that can be any means such as a device or circuitry embodied in either hardware or a combination of hardware and software that is configured to receive and/or transmit data from/to other electronic devices in communication with the apparatus 102, such as the map database 104 that stores data (e.g., map data, isoline map data, probe data, time to departure probability prediction data, location data, geo-referenced locations, transit mode data, historical transit time data, user profile data, timestamp data, environmental data, metadata, etc.) generated and/or employed by the processing circuitry 106. Additionally or alternatively, the communication interface 110 can be configured to communicate in accordance with various wireless protocols including, but not limited to, Global System for Mobile Communications (GSM), Long Term Evolution (LTE), fifth-generation (5G), etc. In this regard, the communication interface 110 can include, for example, an antenna (or multiple antennas) and supporting hardware and/or software for enabling communications with a wireless communication network. In this regard, the communication interface 110 can include, for example, an antenna (or multiple antennas) and supporting hardware and/or software for enabling communications with a wireless communication network. Additionally or alternatively, the communication interface 110 can include the circuitry for interacting with the antenna(s) to cause transmission of signals via the antenna(s) or to handle receipt of signals received via the antenna(s). In some environments, the communication interface 110 can alternatively or also support wired communication and/or may alternatively support vehicle to vehicle or vehicle to infrastructure wireless links.

In certain embodiments, the apparatus 102 can be equipped or associated with one or more sensors 112, such as one or more GPS sensors, one or more accelerometer sensors, one or more LiDAR sensors, one or more radar sensors, one or more gyroscope sensors, one or more ultrasonic sensors, one or more infrared sensors and/or one or more other sensors. Any of the one or more sensors 112 may be used to sense information regarding movement, positioning, and/or orientation of the apparatus 102 for use in navigation assistance and/or routing assistance, as described herein according to example embodiments.

FIG. 2 illustrates a flowchart depicting a method 200 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 108 of the apparatus 102 employing an embodiment of the present disclosure and executed by the processing circuitry 106. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 2, the operations performed, such as by the apparatus 102 of FIG. 1, in order to provide for quantifying public transport coverage for one or more locations based on predicted time to departure data, in accordance with one or more embodiments of the present disclosure. As shown in block 202 of FIG. 2, the apparatus 102 includes means, such as the processing circuitry 106, the memory 108, or the like, configured to determine, for a traveler journey beginning at a starting location at a respective time of day, transit time data indicative of a predicted amount of time to travel between the starting location and a departure location associated with a public transport boarding location for a public transport. The time of day may correspond to a particular time (e.g., 9 am). Alternatively, for traveler journeys that vary from day to day, the time of day may additionally or alternatively correspond to a particular day of week (e.g., Monday). The public transport includes, for example, a train, a bus, a subway train, a railcar, a rapid transit vehicle, a tram, a ride service vehicle, a shared vehicle, a taxi, an on-demand vehicle, a plane, and/or another public transport entity.

In one or more embodiments, the traveler journey can include a navigation route that begins at the starting location and ends at the departure location. Furthermore, in one or more embodiments, the traveler journey employs two or more transit modes. For example, in an embodiment, the traveler journey can include a particular transit mode (e.g., walking, bicycling, a scooter, a ride service, an on-demand vehicle, etc.) in order to employ another transit mode (e.g., public transport) at the departure location. In certain embodiments, the apparatus 102, such as the processing circuitry 106, can be configured to determine the transit time based on a transit mode for the navigation route between the starting location and the departure location. The transit mode can be a type of transit to be employed by the pedestrian in order to reach the departure location associated with the public transport. The transmit mode can include one or more transit modes to be employed by the pedestrian in order to reach the departure location associated with the public transport. For example, the transit mode can include a walking transit mode associated with walking during the traveler journey, a bicycling mode associated with bicycling during the traveler journey, a ride service transit mode associated with employing a ride service during the traveler journey, an on-demand vehicle service transit mode associated with employing an on-demand vehicle during the traveler journey, a scooter transit mode associated with employing scooter during the traveler journey, and/or another type of transit mode associated with the traveler journey.

In certain embodiments, the apparatus 102, such as the processing circuitry 106, can be configured to additionally or alternatively determine the transit time data based on historical transit time data for the navigation route between the starting location and the departure location. For instance, in an embodiment, the historical transit time data can be stored in the memory 108, the map database 104, and/or another datastore accessible by the apparatus 102. In certain embodiments, the historical transit time data is indicative of a historical amount of time to travel between the starting location and the departure location associated with the public transport boarding location for the public transport. In one or more embodiments, the apparatus 102, such as the processing circuitry 106, can be configured to additionally or alternatively determine the transit time data based on a standard transit time (e.g., standard walking pace time, standard bicycle pace time, standard scooter pace time, etc.) for a pedestrian and/or a group of pedestrians. The historical amount of time to travel between the starting location and the departure location can be determined based on an aggregation of travel times for historical traveler journeys. In certain embodiments, the historical transit time data is indicative of information related to probe points stored in one or more map layers associated with the navigation route.

In certain embodiments, the apparatus 102, such as the processing circuitry 106, can be configured to additionally or alternatively determine the transit time data based on user profile data. In certain embodiments, the user profile data can be associated with the pedestrian for the traveler journey that begins at the starting location and ends at the departure location. In certain embodiments, the user profile data can be associated with a request to determine time to departure data for the departure location associated with the public transport. In certain embodiments, the user profile data can include historical transit time data for the pedestrian for the traveler journey that begins at the starting location and ends at the departure location, In certain embodiments, the user profile data can additionally or alternatively include user preferences, user characteristics (e.g., an average walking stride length for the pedestrian, an average walking speed of the pedestrian), fitness activity data from a computing device (e.g., an activity tracker device, a smartphone device, a smartwatch device, etc.), and/or other data associated with the pedestrian.

In certain embodiments, the apparatus 102, such as the processing circuitry 106, can be configured to additionally or alternatively determine the transit time data based on environmental data for the starting location and/or the navigation route. In certain embodiments, the environmental data can include one or more environmental conditions (e.g., a weather condition, etc.) associated with the starting location and/or the navigation route. In certain embodiments, the environmental data can include one or more road conditions (e.g., real-time road condition data, historical road condition data, a vehicle traffic condition, a road construction condition, a pedestrian traffic condition, etc.) associated with the starting location and/or the navigation route.

As shown in block 204 of FIG. 2, the apparatus 102 additionally includes means, such as the processing circuitry 106, the memory 108, or the like, configured to determine waiting time data indicative of a predicted amount of time to wait at the departure location prior to departure via the public transport for the traveler journey beginning at the respective time of day. In certain embodiments, the apparatus 102, such as the processing circuitry 106, can be configured to determine the waiting time data based on public transport timetable data. The public transport timetable data can be, for example, a schedule for a public transport. For example, the public transport timetable data can include train schedule data associated with one or more scheduled departures of a train, bus schedule data associated with one or more scheduled departures of a bus, ride service vehicle data associated with one or more historical departures for a ride service vehicle, and/or other public transport schedule data associated with one or more scheduled departures of another public transport. In certain embodiments, the public transport timetable data can include historical data associated with a comparison between a scheduled departure time and an actual departure time of a public transport. In certain embodiments, the public transport timetable data can additionally or alternatively include historical data associated with historical waiting times for one or more historical traveler journeys for one or more pedestrians. The public transport timetable data can additionally or alternatively include location data historical departures. In certain embodiments, the public transport timetable data can additionally or alternatively include historical probe points for respective public transports.

In certain embodiments, the apparatus 102, such as the processing circuitry 106, can be configured to determine the waiting time data utilizing a machine learning model configured for waiting time prediction for the departure location. In certain embodiments, the apparatus 102, such as the processing circuitry 106, can be configured to train the machine learning model based on the one or more features associated with the public transport. For example, in one or more embodiments, the apparatus 102, such as the processing circuitry 106, can be configured to train the machine learning model based on the public transport timetable data and/or historical departure times associated with the public transport at the departure location. In one or more embodiments, the machine learning model can include model data and/or a prediction algorithm associated with waiting time prediction for the departure location for the public transport. In an embodiment, the machine learning model can be a decision tree model associated with a tree-like decision structure to facilitate waiting time prediction associated with the departure location for the public transport. In another embodiment, the machine learning model can be a random forest model associated with one or more random decision forest structures to facilitate waiting time prediction associated with the departure location for the public transport. In yet another embodiment, the machine learning model can be a neural network model (e.g., a deep learning model, an artificial neural network model, a convolutional neural network model, etc.) associated with artificial neural structures, convolutional layers, pooling layers, fully connected layers, connections, and/or weights to facilitate waiting time prediction associated with the departure location for the public transport. In various embodiments, the apparatus 102, such as the processing circuitry 106, can be configured to repeatedly train the machine learning model until a certain degree of accuracy is achieved for the machine learning model. For example, in various embodiments, the apparatus 102, such as the processing circuitry 106, can be configured to repeatedly train the machine learning model until accuracy of the machine learning model is equal to or greater than a specific accuracy threshold value (e.g., a defined F-score value).

As shown in block 206 of FIG. 2, the apparatus 102 additionally includes means, such as the processing circuitry 106, the memory 108, or the like, configured to compute, based on a combination of the transit time data and the waiting time data, time to departure data indicative of a predicted amount of time until departure via the public transport at the departure location. In an embodiment, time to departure can correspond to a time for transit (e.g., an amount of time to walk to the departure location, an amount of time to bike to the departure location, etc.) plus a waiting time. As such, in one or more embodiments, the apparatus 102, such as the processing circuitry 106, can be configured combine the transit time data and the waiting time data to compute the time to departure data.

FIG. 3 illustrates a diagram 300 associated with time to departure prediction. For example, the diagram 300 includes a starting location 302 and a departure location 304 for a traveler journey related to public transport for a pedestrian. The starting location 302 is, for example, a starting location for the pedestrian of the traveler journey at a respective time of day. The departure location 304 is, for example, a public transport boarding location for a public transport. In planning the traveler journey, it is desirable to arrive at the departure location 304 for the public transport at a particular time. A time at which the pedestrian is likely to arrive at the departure location may be called an estimated time of arrival (ETA), which can be determined based on the transit time data 306. However, in certain traveler journey scenarios, the pedestrian waits at the starting location 302 for a particular amount of time (e.g., waiting time data 308). For example, in certain traveler journey scenarios, the pedestrian can wait at the starting location 302 for a ride service vehicle or another type of transport. Additionally or alternatively, in certain traveler journey scenarios, the pedestrian waits at the departure location 304 for the public transport for a particular amount of time (e.g., waiting time data 310). For example, in certain traveler journey scenarios, the pedestrian may arrive at the departure location 304 earlier than a scheduled departure time of the public transport and/or a scheduled departure time for the public transport may be delayed. As such, in one or more embodiments, the apparatus 102, such as the processing circuitry 106, can be configured to determine transit time data 306 indicative of a predicted amount of time to travel between the starting location 302 and the departure location 304. Furthermore, in one or more embodiments, the apparatus 102, such as the processing circuitry 106, can be configured to determine the waiting time data 308 indicative of a predicted amount of time to wait at the starting location 302 prior to a traveler journey between the starting location 302 and the departure location 304. Additionally or alternatively, in one or more embodiments, the apparatus 102, such as the processing circuitry 106, can be configured to the waiting time data 310 indicative of a predicted amount of time to wait at the departure location 304 prior to departure 312 of the pedestrian via the public transport.

In one or more embodiments, the apparatus 102, such as the processing circuitry 106, can be configured to determine the waiting time data 308 based on historical data such as, for example, a historical amount of time to wait at the starting location 302 prior to a traveler journey. In certain embodiments, the historical amount of time to wait at the starting location 302 can be determined based on user profile data for the pedestrian undergoing the traveler journey between the starting location 302 and the departure location 304, a type of transit mode for the traveler journey between the starting location 302 and the departure location 304, aggregated historical data for a group of passengers, and/or other historical data. In one or more embodiments, the apparatus 102, such as the processing circuitry 106, can be configured to determine the waiting time data 310 based on historical data such as, for example, a historical amount of time to wait at the departure location 304 prior to departure via a public transport. In certain embodiments, the historical amount of time to wait at the starting location 302 can be determined based on public transport timetable data related to the departure location 304, public transport timetable data related to a type of public transport for the departure 312, user profile data for the pedestrian undergoing the traveler journey between the starting location 302 and the departure location 304, aggregated historical data for a group of passengers, and/or other historical data.

As shown in block 208 of FIG. 2, the apparatus 102 additionally includes means, such as the processing circuitry 106, the memory 108, or the like, configured to determine, for the traveler journey beginning at the respective time of day and based on the time to departure data, a time to departure probability prediction indicative of a probability of the departure via the public transport at the departure location satisfying a predefined temporal threshold. Satisfying the predefined temporal threshold can include, for example, a time to departure being above the predefined temporal threshold, a time to departure being below the predefined temporal threshold, or a time to departure being within a predefined time range. In an example, the time to departure probability prediction can indicate that a pedestrian has a 90% chance of departing via the public transport at the departure location when beginning the traveler journey at the respective time of day. In another example, the time to departure probability prediction can indicate that a pedestrian has a 90% chance of missing a next scheduled departure of the public transport (e.g., a next Y scheduled departure(s), where Y is an integer) at the departure location when beginning the traveler journey within a certain window of time.

In certain embodiments, the apparatus 102, such as the processing circuitry 106, can be configured to aggregate the time to departure data for traveler journeys beginning at the starting location throughout an interval of time that includes the respective time of day. In certain embodiments, the apparatus 102, such as the processing circuitry 106, can be configured to additionally or alternatively aggregate the time to departure data for traveler journeys for other travelers that also begin at the starting location during the interval of time. In certain embodiments, the apparatus 102, such as the processing circuitry 106, can be configured to additionally or alternatively aggregate the time to departure data with other time to departure data associated with different starting locations for the interval of time. In certain embodiments, the apparatus 102, such as the processing circuitry 106, can be configured to additionally or alternatively aggregate the time to departure data with other time to departure data associated with different departure locations for the starting location.

In certain embodiments, the apparatus 102, such as the processing circuitry 106, can be configured to encode the time to departure data in a database (e.g., a map database) to facilitate the time to departure probability prediction. In certain embodiments, the apparatus 102, such as the processing circuitry 106, can be configured to map the time to departure data onto a map data layer of an isoline map. For example, in certain embodiments, the time to departure data can be employed for journey planning associated with real-time mapping and/or machine learning that provides an optimal end-to-end experience for a pedestrian via a user interface of a computing device associated with the pedestrian, where the time to departure data provides a reduction of queries and/or a reduction in a number of displays associated with user interaction with respect to the user interface. As such, in certain embodiments, to facilitate the journey planning, the apparatus 102 can support a mapping, navigation, location and/or transit application so as to present maps or otherwise provide navigation or pedestrian assistance, such as in an example embodiment in which map data is created or updated using methods described herein. For example, in certain embodiments, the apparatus 102, such as the processing circuitry 106, can be configured to create a grid of points where each point can correspond to a potential departure location for a public transport. Furthermore, for each point on the grid and at a give time, the apparatus 102, such as the processing circuitry 106, can be configured to compute, for a certain number of public transport locations within a certain geographical region, a predicted time to departure value. In certain embodiments, the apparatus 102, such as the processing circuitry 106, can be configured to select a departure location for a public transport with a smallest predicted time to departure value for a particular starting location.

In certain embodiments, the apparatus 102, such as the processing circuitry 106, can be configured to provide for display of a map and/or instructions for following the navigation route for the traveler journey via a user interface (e.g., a graphical user interface). In order to support a mapping application, the apparatus 102 can include or otherwise be in communication with a location database, such as map database 104, a location database stored in the memory 108, and/or map database 410 shown in FIG. 4. For example, the location database can include node data records, transit stops, transit segment or link data records, point of interest (POI) data records, real-line geometries, pedestrian access points, pedestrian entrance points, pedestrian exit points, transit platform information, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology can be used, such as electronic horizon sensors, radar, LiDAR, ultrasonic sensors and/or infrared sensors.

In example embodiments, a navigation system user interface can be provided to provide pedestrian assistance to a pedestrian traveling along a navigation route for the traveler journey. Establishing transit departure locations and positions along a navigation route for traveler journeys can provide information useful to navigation, pedestrian routing, and/or urban mobility such that map features in the map, e.g., a high definition (HD) map, associated with the specific locations can be reliably used to aid in navigation, pedestrian routing, and/or urban mobility.

Referring back to FIG. 4, illustrated is a communication diagram of an example embodiment of a system for implementing example embodiments described herein. The illustrated embodiment of FIG. 4 includes a mobile device 404, which can be, for example, the apparatus 102 of FIG. 1, such as a mobile device (e.g., a mobile phone, a smartphone, a smart device, a wearable device, a navigation system, or the like). The illustrated embodiment of FIG. 4 also includes a map data service provider 408. The mobile device 404 and the map data service provider 408 can be in communication via a network 412. The network 412 can be any form of wireless or partially wireless network as will be described further below. Additional, different, or fewer components can be provided. For example, many mobile devices 404 can connect with the network 412. In an embodiment, the map data service provider 408 can be a cloud service. For instance, in certain embodiments, the map data service provider 408 can provide cloud-based services and/or can operate via a hosting server that receives, processes, and provides data to other elements of the system 400.

The map data service provider 408 can include a map database 410 that can include node data records, transit stops, transit segment or link data records, POI data records, real-line geometries, pedestrian access points, pedestrian entrance points, pedestrian exit points, transit platform information, and other data records. In one embodiment, the map database 410 can be different than the map database 104. In another embodiment, at least a portion of the map database 410 can correspond to the map database 104. The map database 410 can also include routing data, in certain embodiments. According to some example embodiments, the road segment data records can be links or segments representing walkways, roads, streets, stairways, crosswalks, bridges, tunnels, elevators, escalators, or paths, as can be used in calculating a route or recorded route information for determination of one or more personalized routes. The node data can be end points corresponding to the respective links or segments of road segment data and/or transit data. The road link data and the node data can represent a transportation network, such as used by pedestrians, bicycles, scooters, vehicles, cars, trucks, buses, motorcycles, taxis, trains, subways, trams, planes and/or other entities. Optionally, the map database 410 can contain path segment and node data records or other data that can represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as transit stations, transit stops, transit connections, ride sharing connections, on-demand vehicle connections, fueling stations, hotels, restaurants, museums, stadiums, offices, auto repair shops, buildings, stores, parks, etc. The map database 410 can include data about the POIs and their respective locations in the POI records. The map database 410 can include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 410 can include event data (e.g., traffic incidents, construction activities, scheduled events, unscheduled events, etc.) associated with the POI data records or other records of the map database 410.

The map database 410 can be maintained by the map data service provider 408 and can be accessed, for example, by a processing server 402 of the map data service provider 408. By way of example, the map data service provider 408 can collect location data, geographic data and/or dynamic data to generate and enhance the map database 410. In one example, the dynamic data can include traffic-related data. There can be different ways used by the map data service provider 408 to collect data. These ways can include obtaining data from other sources, such as municipalities or respective geographic authorities, such as via global information system databases. In addition, the map data service provider 408 can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that can be available is vehicle data provided by vehicles, such as provided, e.g., as probe points, by mobile device 404, as they travel roads and/or paths throughout a region.

In certain embodiments, at least a portion of the map database 104 can be included in the map database 410. In an embodiment, the map database 410 can be an isoline map database. In another embodiment, the map database 410 can be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form location database products or databases, which can be used in end user navigation devices or systems. For example, geographic data can be compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to pedestrian navigation, vehicle navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 410 of the map data service provider 408 can be a master location database, but in alternate embodiments, a client side map database can represent a compiled navigation database that can be used in or with end user devices (e.g., mobile device 404) to provide navigation and/or map-related functions. For example, the map database 410 can be used with the mobile device 404 to provide an end user with navigation features. In such a case, the map database 410 can be downloaded or stored on the end user device which can access the map database 410 through a wireless or wired connection, such as via a processing server 402 and/or the network 412, for example.

In one embodiment, as noted above, the end user device or mobile device 404 can be embodied by the apparatus 102 of FIG. 1 and can include a portable navigation device, a cellular telephone, a smart phone, a personal digital assistant (PDA), a watch, a camera, a virtual reality device, a computer, a server and/or other device that can perform navigation-related functions, such as digital routing and map display. An end user can use the mobile device 404 for navigation and map functions such as guidance and map display, for example, and for determination of useful driver assistance information, according to some example embodiments. In one or more embodiments, the apparatus 102, such as the processing circuitry 106, can be additionally or alternatively configured to facilitate routing of a pedestrian based on the time to departure probability prediction. In one or more embodiments, the apparatus 102, such as the processing circuitry 106, can be additionally or alternatively configured to cause rendering of data via a map display of a computing device based on the time to departure probability prediction.

In certain embodiments, the apparatus 102, such as the processing circuitry 106, can be configured to map the indication of the time to departure probability prediction onto one or more map data layers of a map (e.g., an isoline map, an HD map, etc.) to facilitate navigation and/or routing associated with a pedestrian. For instance, in certain embodiments, the apparatus 102, such as the processing circuitry 106, can be configured to store the time to departure probability prediction in a map data layer of a map (e.g., an isoline map, an HD map, etc.) for mapping purposes, navigation purposes, and/or pedestrian routing purposes. In certain embodiments, the apparatus 102, such as the processing circuitry 106, can be configured to link and/or associate the time to departure probability prediction with one or more portions, components, areas, layers, features, text, symbols, and/or data records of a map (e.g., an isoline map, an HD map, etc.). In one or more embodiments, the apparatus 102, such as the processing circuitry 106, can be configured to generate a data point for a map layer based on the time to departure probability prediction. The data point can indicate time to departure probability prediction for a particular location. Additionally or alternatively, in one or more embodiments, the apparatus 102, such as the processing circuitry 106, can be configured to store the data point in the database associated with a map layer.

FIG. 5 illustrates an example embodiment of an architecture specifically configured for implementing embodiments described herein. The illustrated embodiment of FIG. 5 may be employed for navigation, routing and/or journey planning, where time to departure probability prediction(s) 502 are determined for one or more traveler journeys. According to one or more embodiments, the time to departure probability prediction(s) 502 can be correlated to map data of the map data service provider 408. In certain embodiments, time to departure probability prediction(s) 502 can be correlated to one or more map data layers of an isoline map. A user may acquire more accurate navigation information, routing information, transit information, and/or urban mobility information through the time to departure probability prediction(s) 502. Additionally, the time to departure probability prediction(s) 502 may provide a reduction in a number of queries and/or a number of displays via a user interface (e.g., a user interface of the mobile device 404) to facilitate navigation, routing and/or journey planning.

As illustrated in FIG. 5, the architecture includes the map data service provider 408 that provides map data 525 (e.g., isoline maps, HD maps and/or policies associated with links within the map) to a user interface 540. The map data service provider 408 may be a cloud-based 510 service. In one or more embodiments, a server 505 receives the time to departure probability prediction(s) 502 and may provide the time to departure probability prediction(s) 502 to a map matcher 515. The map matcher 515 may correlate the time to departure probability prediction(s) 502 to a link, segment and/or a probe point on a map of one or more geographical regions stored in the map cache 520. In certain embodiments, the link, segment and/or probe point may be used to establish which map policies (e.g., isoline map policies, HD map policies, etc.) are applicable for presentation of navigation information, routing information, transit information, and/or urban mobility information via the user interface 540. In certain embodiments, a data access layer 535 can manage and/or facilitate access to the map cache 520, the map data 525, and/or a map database 530. In an embodiment, at least a portion of the map database 530 can correspond to the map database 104 and/or the map database 410.

FIG. 6 illustrates a flowchart depicting a method 600 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 108 of the apparatus 102 employing an embodiment of the present disclosure and executed by the processing circuitry 106. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 6, the operations performed, such as by the apparatus 102 of FIG. 1, in order to provide for quantifying public transport coverage for one or more locations based on predicted time to departure data, in accordance with one or more embodiments of the present disclosure. As shown in block 602 of FIG. 6, the apparatus 102 includes means, such as the processing circuitry 106, the memory 108, or the like, configured to generate a request for time to departure data for a departure location associated with public transport, the time to departure data being based on a combination of: (i) transit time data indicative of a predicted amount of time to travel between a starting location and the departure location and (ii) waiting time data indicative of a predicted amount of time to wait at the departure location prior to departure via the public transport for a traveler journey beginning at a respective time of day. In certain embodiments, the request can include a respective time of day. Furthermore, in certain embodiments, the time to departure probability prediction data for the respective geographical region can be dependent up on the respective time of day. In certain embodiments, the request can additionally or alternatively include a transit mode for a navigation route between the respective regions and the departure location. Furthermore, in certain embodiments, the time to departure probability prediction data for the respective geographical region can be additionally or alternatively dependent upon the transit mode. In certain embodiments, the request can be associated with a particular traveler. Furthermore, in certain embodiments, the time to departure probability prediction data for the respective geographical region can be dependent up on user profile data for the respective traveler.

As shown in block 604 of FIG. 6, the apparatus 102 additionally includes means, such as the processing circuitry 106, the memory 108, or the like, configured to, in response to the request, receive time to departure probability prediction data for a plurality of geographical regions, the time to departure probability prediction data indicative of a probability of a departure from the departure location via the public transport satisfying a predefined temporal threshold for the traveler journey beginning at the respective time of day from the starting location within a respective geographical region. In one or more embodiments, the apparatus 102, such as the processing circuitry 106, can be configured to receive the time to departure probability prediction data from a server (e.g., the server 505) and/or a map data service provider (e.g., the map data service provider 408).

As shown in block 606 of FIG. 6, the apparatus 102 additionally includes means, such as the processing circuitry 106, the memory 108, or the like, configured to render a visual representation of the time to departure probability prediction data for the respective regions via a user interface. The user interface can be a user interface (e.g., the user interface 540) of a computing device (e.g., the mobile device 404). For example, in certain embodiments, the apparatus 102, such as the processing circuitry 106, can be configured to render the visual representation of the time to departure probability prediction data for the respective geographical region via a display of a computing device. In an embodiment, the visual representation of the time to departure probability prediction data can be presented, for example, via a map presented on a user interface. For example, in certain embodiments, the apparatus 102, such as the processing circuitry 106, can be configured to render the visual representation of the time to departure probability prediction data for the respective regions via a map display interface. In certain embodiments, the user interface can be configured to present a map display associated with navigation, routing, and/or journey planning for the traveler journey. In another embodiment, the visual representation of the time to departure probability prediction data can be presented as a textual element, a visual element, and/or a graphical element. For example, in certain embodiments, the apparatus 102, such as the processing circuitry 106, can be configured to render the visual representation of the time to departure probability prediction data as a list, a graph, a key (e.g., a value associated with a color, etc.), a notification, and/or as another visual indicator via a user interface.

FIG. 7 illustrates an example embodiment of a user interface 700 configured for implementing embodiments described herein. The user interface 700 is a user interface of a computing device such as, for example, the mobile device 404. In an embodiment, the user interface 700 corresponds to the user interface 540. In one or more embodiments, the user interface 700 is a map display interface that provides a visual representation of a starting location 702 and a departure location 704 for a real-world traveler journey beginning at a respective time of day. In certain embodiments, the apparatus 102, such as the processing circuitry 106, can be configured to cause rendering of a navigation route associated with the starting location 702 and the departure location 704 via the user interface 700.

In one or more embodiments, the apparatus 102, such as the processing circuitry 106, can be configured to access location data associated with the user interface 700 to facilitate determination of the starting location 702 and/or a location of the apparatus 102. In one or more embodiments, the location data can include geographic coordinates for the apparatus 102. In an embodiment, the location data can include latitude data and/or longitude data defining the location of the starting location 702 and/or the apparatus 102. In an aspect, the location data can be generated based on the one or more sensors 112. For example, in an embodiment, the he location data can be generated based on a GPS or other location sensor.

In one or more embodiments, a request for time to departure data for the departure location 704 associated with public transport is generated via a journey planning interactive element 706 of the user interface 700. In one or more embodiments, the time to departure data being based on a combination of: (i) transit time data indicative of a predicted amount of time for a pedestrian to travel between the starting location 702 and the departure location 704 and (ii) waiting time data indicative of a predicted amount of time for the pedestrian to wait at the departure location 704 prior to departure via the public transport. In one or more embodiments, time to departure probability prediction data 708 is presented via the user interface 700. The time to departure probability prediction data 708 can be indicative of visualization of a probability of a departure from the departure location 704 via the public transport satisfying a predefined temporal threshold for the traveler journey beginning at the respective time of day from the starting location 702.

In an embodiment, the time to departure probability prediction data 708 can correspond to an average time to any departure location determined to be proximate to the starting location 702. In another embodiment, the time to departure probability prediction data 708 can correspond to an average time to a next public transport departure at the departure location 704. For example, for the starting location 702, the time to departure probability prediction data 708 can indicate that a probability of departure via a first public transport at a first departure location associated with the first public transport is 90%, that a probability of departure via a second public transport at a second departure location associated with the first public transport is 75%, and that a probability of departure via a third public transport at a third departure location associated with the third public transport is 95%. In another example, for the starting location 702, the time to departure probability prediction data 708 can indicate that average time to departure for a first departure location associated with a first public transport is 7 minutes, that average time to departure for a second departure location associated with a second public transport is 12 minutes, and that average time to departure for a second departure location associated with a third public transport is 9 minutes. In another embodiment, the time to departure probability prediction data 708 can correspond to an average time to a next departure of a particular line and direction. For example, for the starting location 702, the time to departure probability prediction data 708 can indicate that an average time to departure is 7 minutes in a first direction associated with a first navigation route to the departure location 704, and 6 minutes in a second direction for a second navigation route to the departure location 704. In certain embodiments, the time to departure probability prediction data 708 can correspond to an average time to departure for two or more departure locations when starting a traveler journey from the starting location 702.

In certain embodiments, a request via the journey planning interactive element 706 can include a query such as, for example, "find all locations in a city which have an average time to departure that is less than or equal to 7 minutes," "find all geographical regions in town A with a lowest average time to departure," or "find all geographical regions in town B that are good candidates for micro-mobility providers or ride sharing services."

In certain embodiments, in response to a determination that the departure location 704 is defined in the request via the journey planning interactive element 706, the apparatus 102, such as the processing circuitry 106, can be configured to determine a set of navigation routes with a similar ETA, and to compute an average time to departure for respective navigation routes in the set of navigation routes. In certain embodiments, in response to a determination that a navigation route is defined in the request via the journey planning interactive element 706, the apparatus 102, such as the processing circuitry 106, can be configured to compute an average time to departure for the navigation route defined in the request. In certain embodiments, in response to a determination that the starting location 702 and a time window is defined in the request via the journey planning interactive element 706, the apparatus 102, such as the processing circuitry 106, can be configured to compute an average time to departure for one or more navigation routes to one or more departure locations for the given time window.

FIG. 8 illustrates an example embodiment of a user interface 800 configured for implementing embodiments described herein. The user interface 800 is a user interface of a computing device such as, for example, the mobile device 404. In an embodiment, the user interface 800 corresponds to the user interface 540. In one or more embodiments, the user interface 800 is an isoline display interface that provides a visual representation of time to departure probability prediction data for respective geographical regions. For example, in an embodiment, the user interface 800 includes at least time to departure probability prediction data 802 associated with a first geographical region and time to departure probability prediction data 804 associated with a second geographical region. In an embodiment, the time to departure probability prediction data 802 is visually represented as a first isoline region configured with a first visual indicator (e.g., a first color) and the time to departure probability prediction data 804 is visually represented as a second isoline region configured with a second visual indicator (e.g., a second color). The time to departure probability prediction data 802 can visually indicate that a pedestrian is likely (e.g., 90% chance) to successfully depart from a departure location via a public transport when beginning at a respective time of day from a particular starting location within the first geographical region associated with the time to departure probability prediction data 802. For example, the time to departure probability prediction data 802 can visually indicate that the pedestrian at a given location (e.g., a particular starting location within the first geographical region) will, at a 90% probability, be able to depart via a public transport (e.g., a train, a bus, a ride sharing service vehicle, another public transport, etc.) within 10 minutes. Furthermore, the time to departure probability prediction data 804 can visually indicate that a pedestrian is unlikely (e.g., 10% chance) to successfully depart from a departure location via a public transport when beginning at a respective time of day from a particular starting location within the second geographical region associated with the time to departure probability prediction data 804. For example, the time to departure probability prediction data 804 can visually indicate that the pedestrian at a given location (e.g., a particular starting location within the second geographical region) will, at a 10% probability, be able to depart via a public transport (e.g., a train, a bus, a ride sharing service vehicle, another public transport, etc.) within 10 minutes. In certain embodiments, the apparatus 102, such as the processing circuitry 106, can be configured to dynamically update departure probability prediction data (e.g., the departure probability prediction data 802 and/or the departure probability prediction data 804) for the user interface 800 based on time of day. In certain embodiments, the apparatus 102, such as the processing circuitry 106, can be configured to dynamically update departure probability prediction data (e.g., the departure probability prediction data 802 and/or the departure probability prediction data 804) for the user interface 800 based on a change in a current location associated with a computing device and/or a change in a view associated with the user interface 800.

FIG. 9 illustrates an example embodiment of a user interface 900 configured for implementing embodiments described herein. The user interface 900 is a user interface of a computing device such as, for example, the mobile device 404. In an embodiment, the user interface 900 corresponds to the user interface 540. In one or more embodiments, the user interface 900 is an isoline display interface that provides a visual representation of time to departure probability prediction data for respective geographical regions. For example, in an embodiment, the user interface 900 includes at least time to departure probability prediction data 902 associated with a first geographical region and time to departure probability prediction data 904 associated with a second geographical region. In an embodiment, the time to departure probability prediction data 902 is visually represented as a first isoline region configured with a first visual indicator (e.g., a green color) and the time to departure probability prediction data 904 is visually represented as a second isoline region configured with a second visual indicator (e.g., a red color). For instance, the time to departure probability prediction data 902 can visually indicate that the first geographical region is associated with a first amount of time to departure for a given time of day and the time to departure probability prediction data 904 can visually indicate that the second geographical region is associated with a second amount of time to departure via a public transport for a given time of day. In a non-limiting example, the time to departure probability prediction data 904 can visually indicate that, for a given time of day, the second geographical region is generally associated with a higher amount of time to departure (e.g., transit time plus waiting time) for a public transport than the first geographical region. In certain embodiments, the apparatus 102, such as the processing circuitry 106, can be configured to dynamically update departure probability prediction data (e.g., the departure probability prediction data 902 and/or the departure probability prediction data 904) for the user interface 900 based on time of day. In certain embodiments, the apparatus 102, such as the processing circuitry 106, can be configured to dynamically update departure probability prediction data (e.g., the departure probability prediction data 902 and/or the departure probability prediction data 904) for the user interface 900 based on a change in a current location associated with a computing device and/or a change in a view associated with the user interface 900.

By employing predicted time to departure data to quantify public transport coverage for one or more locations in accordance with one or more example embodiments of the present disclosure, precision and/or confidence of navigation, routing, and/or journey planning provided by a location service can be improved. Furthermore, by employing predicted time to departure data to quantify public transport coverage for one or more locations in accordance with one or more example embodiments of the present disclosure, optimized user interaction with respect to a user interface for navigation, routing, and/or journey planning can be provided. Moreover, in accordance with one or more example embodiments of the present disclosure, efficiency of an apparatus including the processing circuitry can be improved and/or the number of computing resources employed by processing circuitry can be reduced. In one or more embodiments, by employing predicted time to departure data to quantify public transport coverage for one or more locations in accordance with one or more example embodiments of the present disclosure, improved statistical information for ride sharing services and/or on-demand vehicles can be provided to provide improved insights and/or recommendations for determining where to position ride sharing services and/or on-demand vehicles with respect to geographical regions proximate to public transports.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Furthermore, in some embodiments, additional optional operations can be included. Modifications, additions, or amplifications to the operations above can be performed in any order and in any combination.

Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed:

1. A computer-implemented method for quantifying public transport coverage, the computer-implemented method comprising:

for a traveler journey beginning at a starting location at a respective time of day, determining transit time data indicative of a predicted amount of time to travel between the starting location and a departure location associated with a public transport boarding location for a public transport entity;

determining, by utilizing a machine learning model associated with the departure location, waiting time data indicative of a predicted amount of time to wait at the departure location prior to departure via the public transport entity for the traveler journey beginning at the respective time of day, wherein the machine learning model is trained based on a feature set associated with public transport timetable data for one or more public transport entities at the departure location;

computing, based on a combination of the transit time data and the waiting time data, time to departure data indicative of a predicted amount of time until departure via the public transport entity at the departure location;

for the traveler journey beginning at the respective time of day and based on the time to departure data, determining a time to departure probability prediction indicative of a probability of the departure via the public transport entity at the departure location satisfying a predefined temporal threshold; and causing an overlay of isoline map data on particular geographical regions of a map display associated with a user interface based on the time to departure probability prediction.

2. The computer-implemented method of claim 1, wherein determining the time to departure probability prediction comprises aggregating the time to departure data for traveler journeys beginning at the starting location throughout an interval of time that includes the respective time of day.

3. The computer-implemented method of claim 2, wherein determining the time to departure probability prediction comprises aggregating the time to departure data for traveler journeys for other travelers that also begin at the starting location during the interval of time.

4. The computer-implemented method of claim 1, wherein determining the transit time data comprises determining the transit time data based on a transit mode for a navigation route between the starting location and the departure location.

5. The computer-implemented method of claim 1, wherein determining the transit time data comprises determining the transit time data based on historical transit time data for a navigation route between the starting location and the departure location.

6. The computer-implemented method of claim 1, wherein determining the transit time data comprises determining the transit time data based on user profile data associated with a request to determine the time to departure data for the departure location associated with the public transport entity.

7. The computer-implemented method of claim 1, wherein determining the transit time data comprises determining the transit time data based on environmental data for the starting location.

8. The computer-implemented method of claim 1, wherein the machine learning model is repeatedly trained until accuracy of waiting time predictions for the machine learning model satisfies a defined accuracy threshold value.

9. The computer-implemented method of claim 1, wherein the public transport timetable data comprises (i) first public transport timetable data associated with a comparison between scheduled departure times and actual departure times for the one or more public transport entities at the departure location and (ii) second public transport timetable data associated with historical waiting times for one or more historical traveler journeys associated with the departure location.

10. An apparatus configured for quantifying public transport coverage, the apparatus comprising processing circuitry and at least one memory including computer program code instructions, the computer program code instructions configured to, when executed by the processing circuity, cause the apparatus to:
for a traveler journey beginning at a starting location at a respective time of day, determine transit time data indicative of a predicted amount of time to travel between the starting location and a departure location associated with a public transport boarding location for a public transport entity;
determine, based on a machine learning model associated with the departure location, waiting time data indicative of a predicted amount of time to wait at the departure location prior to departure via the public transport entity for the traveler journey beginning at the respective time of day, wherein the machine learning model is trained based on a feature set associated with public transport timetable data for one or more public transport entities at the departure location;
compute, based on a combination of the transit time data and the waiting time data, time to departure data indicative of a predicted amount of time until departure via the public transport entity at the departure location;
for the traveler journey beginning at the respective time of day and based on the time to departure data, determine a time to departure probability prediction indicative of a probability of the departure via the public transport entity at the departure location satisfying a predefined temporal threshold; and
cause an overlay of isoline map data on particular geographical regions of a map display associated with a user interface based on the time to departure probability prediction.

11. The apparatus of claim 10, wherein the computer program code instructions are further configured to, when executed by the processing circuitry, cause the apparatus to:
aggregate the time to departure data for traveler journeys beginning at the starting location throughout an interval of time that includes the respective time of day.

12. The apparatus of claim 11, wherein the computer program code instructions are further configured to, when executed by the processing circuitry, cause the apparatus to:
aggregate the time to departure data for traveler journeys for other travelers that also begin at the starting location during the interval of time.

13. The apparatus of claim 10, wherein the transit time data is determined based on a transit mode for a navigation route between the starting location and the departure location.

14. The apparatus of claim 10, wherein the transit time data is determined based on historical transit time data for a navigation route between the starting location and the departure location.

15. The apparatus of claim 10, wherein the transit time data is determined based on user profile data associated with a request to determine the time to departure data for the departure location associated with the public transport entity.

16. The apparatus of claim 10, wherein the transit time data is determined based on environmental data for the starting location.

17. The apparatus of claim 10, wherein the machine learning model is repeatedly trained until accuracy of waiting time predictions for the machine learning model satisfies a defined accuracy threshold value.

18. The apparatus of claim 10, wherein the public transport timetable data comprises (i) first public transport timetable data associated with a comparison between scheduled departure times and actual departure times for the one or more public transport entities at the departure location and (ii) second public transport timetable data associated with historical waiting times for one or more historical traveler journeys associated with the departure location.

19. An apparatus configured for quantifying public transport coverage, the apparatus comprising processing circuitry and at least one memory including computer program code instructions, the computer program code instructions configured to, when executed by the processing circuity, cause the apparatus to:
generate a request for time to departure data fora departure location associated with a public transport entity, the time to departure data being based on a combination of: (i) transit time data indicative of a predicted amount of time to travel between a starting location and the departure location and (ii) waiting time data indicative of a predicted amount of time to wait at the departure location prior to departure via the public transport entity for a traveler journey beginning at a respective time of day, wherein the waiting time data is generated based on a machine learning model associated with the departure location, and wherein the machine learning model is trained based on a feature set associated with public transport timetable data for one or more public transport entities at the departure location;

in response to the request, receive time to departure probability prediction data for a plurality of geographical regions, the time to departure probability prediction data indicative of a probability of a departure from the departure location via the public transport entity satisfying a predefined temporal threshold for the traveler journey beginning at the respective time of day from the starting location within a respective geographical region; and cause an overlay of isoline map data on particular geographical regions of a map display associated with a user interface based on the time to departure probability prediction data for the plurality of geographical regions.

* * * * *